US007495808B2

(12) United States Patent
Sasakuma et al.

(10) Patent No.: US 7,495,808 B2
(45) Date of Patent: Feb. 24, 2009

(54) DOCUMENT READING DEVICE CAPABLE OF SENDING DATA TO EXTERNAL TERMINAL THROUGH NETWORK

(75) Inventors: Haruna Sasakuma, Toyonaka (JP); Kenichi Nagasawa, Takatsuki (JP)

(73) Assignee: Minolta Co., Ltd., Osaka-Shi, Osaka (JP)

( * ) Notice: Subject to any disclaimer, the term of this patent is extended or adjusted under 35 U.S.C. 154(b) by 931 days.

(21) Appl. No.: 10/317,137

(22) Filed: Dec. 12, 2002

(65) Prior Publication Data

US 2003/0123104 A1    Jul. 3, 2003

(30) Foreign Application Priority Data

Dec. 12, 2001  (JP)  ............... 2001-378143

(51) Int. Cl.
  *H04N 1/04* (2006.01)
  *H04N 1/00* (2006.01)
  *G06F 15/00* (2006.01)
(52) U.S. Cl. ............... 358/474; 358/1.15; 358/403; 358/407
(58) Field of Classification Search ........... 358/474, 358/1.15, 403, 407
See application file for complete search history.

(56) References Cited

U.S. PATENT DOCUMENTS 6,094,277 A    7/2000  Toyoda 6,266,160 B1 *  7/2001  Saito et al. ............ 358/407
6,587,911 B1 *  7/2003  Kawamura et al. ...... 710/315
6,591,312 B1 *  7/2003  Greaves et al. ......... 710/14
6,711,294 B1 *  3/2004  Hamzy et al. .......... 382/232
6,985,242 B1    1/2006  Toyoda

FOREIGN PATENT DOCUMENTS

| JP | 10-304173 | 11/1998 |
|----|-----------|---------|
| JP | 10-308840 | 11/1998 |
| JP | 10-341327 | 12/1998 |
| JP | 11-168498 | 6/1999 |
| JP | 2000-048172 | 2/2000 |
| JP | 2000-059595 | 2/2000 |
| JP | 2000-155722 | 6/2000 |
| JP | 2000-174973 | 6/2000 |
| JP | 2000-285043 | 10/2000 |
| JP | 2001-249881 | 9/2001 |

OTHER PUBLICATIONS

Japanese Office Action dated Nov. 6, 2007 (with English Translation).

* cited by examiner

*Primary Examiner*—Houshang Safaipour
(74) *Attorney, Agent, or Firm*—Buchanan Ingersoll & Rooney PC

(57) ABSTRACT

PC link software stored in a personal computer searches for software installed in the personal computer and determines a file format that can be handled in the resulting software for sending to MFP. When MFP receives a destination for scanned image data, file formats displayable at that destination are displayed to allow the user to select in which format the data is sent. Therefore such a situation can be prevented in that the sent image data cannot be displayed at a personal computer.

10 Claims, 12 Drawing Sheets

FIG.5

| APPLICATION | FILE FORMAT |
|---|---|
| Acrobat Reader | PDF |
| Internet Explore | JPEG、TIFF |
| Word | |
| ⋮ | ⋮ |
| ⋮ | ⋮ |
| ⋮ | ⋮ |
| ⋮ | ⋮ |

FIG.9

| ADDRESS NO. | USER SETTING | PC INFORMATION | FILE FORMAT |
|---|---|---|---|
| 1 | Tanaka@mol | Tanaka | JPEG |
| | | | TIFF |
| | | | ; |
| | | | ; |
| 2 | SATO PC | 160.12.45.23 | |
| 3 | KOJIMA MAIL | Kojima@ccc.jp | PDF |
| | | | ; |
| | | | ; |

| APPLICATION | CORRESPONDING FORM | TIFF TAG AND FORMAT SUPPORTED BY APPLICATION | | | | |
|---|---|---|---|---|---|---|
| | | COMPRESSION | Fillorder | Photometricinterpritation | MultiPage | ... |
| Word | TIFF JPEG | 0,1,32773 | 1,2 | 0 | −1 | ... |
| Imaging | TIFF | 0,1,2,3,4, 32773 | 1,2 | 0,1 | 1 | ... |
| | | | | | | ... |
| ... | ... | ... | ... | ... | ... | ... | ary
DOCUMENT READING DEVICE CAPABLE OF SENDING DATA TO EXTERNAL TERMINAL THROUGH NETWORK This application is based on Japanese Patent Application No.2001-378143, the entire content of which is hereby incorporated by reference.

BACKGROUND OF THE INVENTION

1. Field of the Invention

The present invention relates to a document reading device, and more particularly to a document reading device capable of selecting an appropriate data format in sending data to an external terminal.

2. Description of the Related Art

Conventionally, there exists a technique for sending data to an external device (a personal computer or the like) using a data sending function of MFP (Multi Function Peripherals). In sending data in this manner, the user designates a desired file format in MFP and scans a document. The image data is then sent to an external device in the designated file format.

When there exists no application that can display the data in the user-designated file format in a destination device, however, the data-receiving end cannot display the content. In this case, the document has to be scanned again and converted in the other format displayable at the destination device in order to resend the data. This unfortunately becomes a burden for the user.

Furthermore, since there are different kinds of TIFF (Tagged Image File Format), a TIFF format that is not supported by an application in a receiving-end device may often be selected as a file format. As a result, data cannot be displayed in such a case.

Japanese Patent Laying-Open No. 2000-174973 discloses a method of handling an error of expanding an attachment file at a receiving device, and a technique for making a notification by sending to an originator whether the attachment file of the received email can be viewed.

Also in this technique, however, a notification is made only as to whether an attachment file can be opened. Therefore if the file cannot be opened, the user has to scan the image in a different file format again for resending.

Furthermore, Japanese Patent Laying-Open No. 10-304173 proposes a technique for storing a format of image data that was received before, and sending data in the same format as the received format in a subsequent sending to the other end.

Also in this technique, however, a determination cannot be made based on the application held at the other end.

SUMMARY OF THE INVENTION

The present invention is made to solve the aforementioned problem. An object of the present invention is to provide a document reading device capable of sending data in an appropriate format.

In order to achieve the object described above, in accordance with one aspect of the present invention, a document reading device capable of sending image data obtained by reading a document to an external terminal through a network is provided. The document reading device includes: a receiving portion receiving application information held by the external terminal, through the network; a determining portion determining one or a plurality of data formats that can be processed in the external terminal, based on the received application information; a registering portion registering data for specifying the external terminal and a data format determined by the determining portion in an associated manner; a selecting portion presenting data formats registered in an associated manner in the registering portion to allow the user to select therefrom a data format in sending data, when image data is sent to the external terminal; and a control portion performing control such that the image data is converted into a data format selected in the selecting portion and sent to the external terminal.

In accordance with another aspect of the present invention, a document reading device capable of sending image data obtained by reading a document to an external terminal through a network is provided. The document reading device includes: a storage unit storing information of different kinds of applications that can handle image data and image data formats in an associated manner; a display unit displaying the stored application information or image data formats in a list; a selecting portion allowing the user to select one of the displayed application information or image data formats; and a control portion performing control such that the image data is converted into an image data format corresponding to selected application information or a selected image data format through the selecting portion and is sent to the external terminal.

In accordance with a further aspect of the present invention, an image data processing method allowing image data obtained by reading a document to be sent to an external terminal through a network is provided. The method includes: a receiving step of receiving application information held by the external terminal through the network; a determining step of determining one or a plurality of data formats that can be processed in the external terminal, based on the received application information; a registering step of registering data for specifying the external terminal and a data format determined at the determining step in an associated manner; a selecting step of presenting data formats registered in an associated manner at the registering step to allow the user to select therefrom a data format in sending image data, when image data is sent to the external terminal; and a control step of performing control such that the image data is converted into a data format selected at the selecting step and is sent to the external terminal.

In accordance with yet another aspect of the present invention, an image data processing program product allowing image data obtained by reading a document to be sent to an external terminal through a network is provided. The image data processing program product causes a computer to carry out: a receiving step of receiving application information held by the external terminal through the network; a determining step of determining one or a plurality of data formats that can be processed in the external terminal, based on the received application information; a registering step of registering data for specifying the external terminal and a data format determined at the determining step in an associated manner; a selecting step of presenting data formats registered in an associated manner at the registering step to allow the user to select therefrom a data format in sending image data, when image data is sent to the external terminal; and a control step of performing control such that the image data is converted into a data format selected at the selecting step and is sent to the external terminal.

In accordance with still another aspect of the present invention, a program product is provided having a stored program causing a computer to carry out the steps of: retrieving information of an image data format that can be handled in the computer; and sending information identifying the computer or the user and information regarding an image data format that can be handled to an image reading device capable of communication through a network.

In accordance with a still further aspect of the present invention, a program product is provided having a stored program causing a computer to carry out the steps of: retrieving information of an image data format that can be handled by an application program installed in the computer; and sending information in which an application available in the computer is associated with an image data format is sent to an image reading device capable of communication through a network.

In accordance with other aspect of the present invention, a document reading device capable of sending image data obtained by reading a document to an external terminal through a network is provided. The document reading device includes: a receiving portion receiving data for specifying the external terminal and information regarding an image data format that can be processed in the external terminal, through the network; a registering portion registering the data for specifying the external terminal and the image data format in an associated manner; a selecting portion presenting image data formats registered in an associated manner in the registering portion to allow the user to select therefrom an image data format in sending image data, when image data is sent to the external terminal; and a control portion performing control such that the image data is converted into a data format selected in the selecting portion and is sent to the external terminal.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 5 is a diagram showing an exemplary format list.

FIG. 9 is a diagram showing an exemplary address list.

DESCRIPTION OF THE PREFERRED EMBODIMENTS

In the following, the embodiments of the present invention will be described with reference to the figures.

First Embodiment

Figure 1:
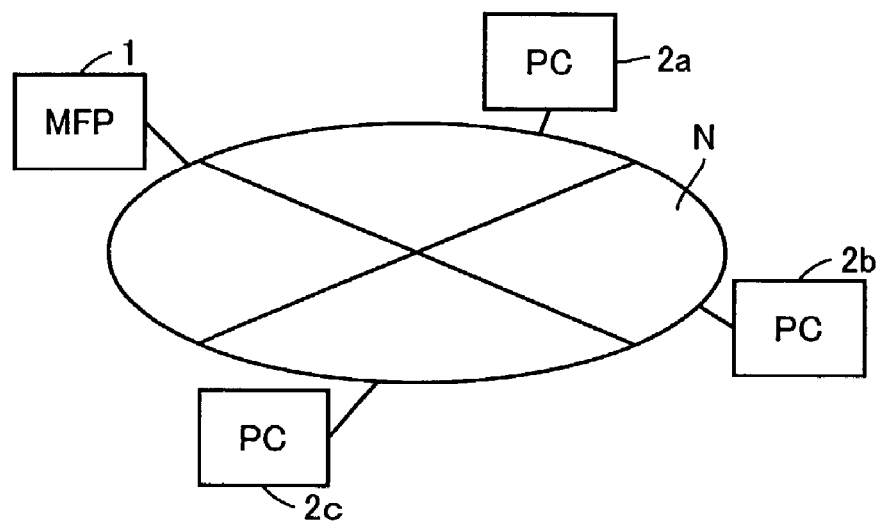
FIG. 1 is a diagram showing a configuration of a data sending system in an embodiment of the present invention.

Referring to FIG. 1, a data sending system includes MFP 1 and a plurality of personal computers 2a-2c, each connected via a network N. It is noted that the internet, a telephone line, a wireless communication line, a private line, or the like can be used as network N.

Although MFP 1 here is provided not only with an image reading function but also with a print function, a facsimile receiving function, a facsimile sending function, and the like, a scanner having only an image reading function or the like may be provided instead of MFP 1.

Furthermore, instead of a personal computer, a terminal such as a PDA (Personal Digital Assistant), a mobile phone, a PHS (Personal Handy Phone) may be used.

Figure 2:
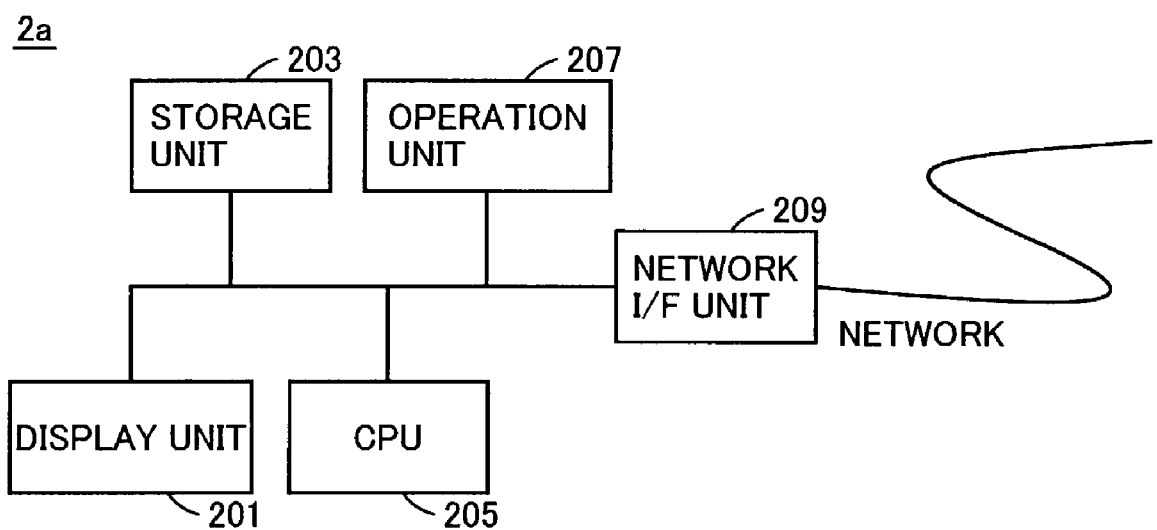
FIG. 2 is a block diagram showing a configuration of a personal computer in FIG. 1.

FIG. 2 is a block diagram showing the configuration of one of personal computers shown in FIG. 1.

Referring to FIG. 2, the personal computer includes a storage unit 203 formed of a hard disk drive, a memory or the like, an operation unit 207 formed of a key board, a mouse or the like receiving an input from the user, a display unit 201 displaying data, a CPU 205 controlling the entire device, and a network interface unit 209 for connecting to network N.

Storage unit 203 stores software (referred to as "PC link software" hereinafter) associated with MFP 1 and various applications installed by the user.

Figure 3:
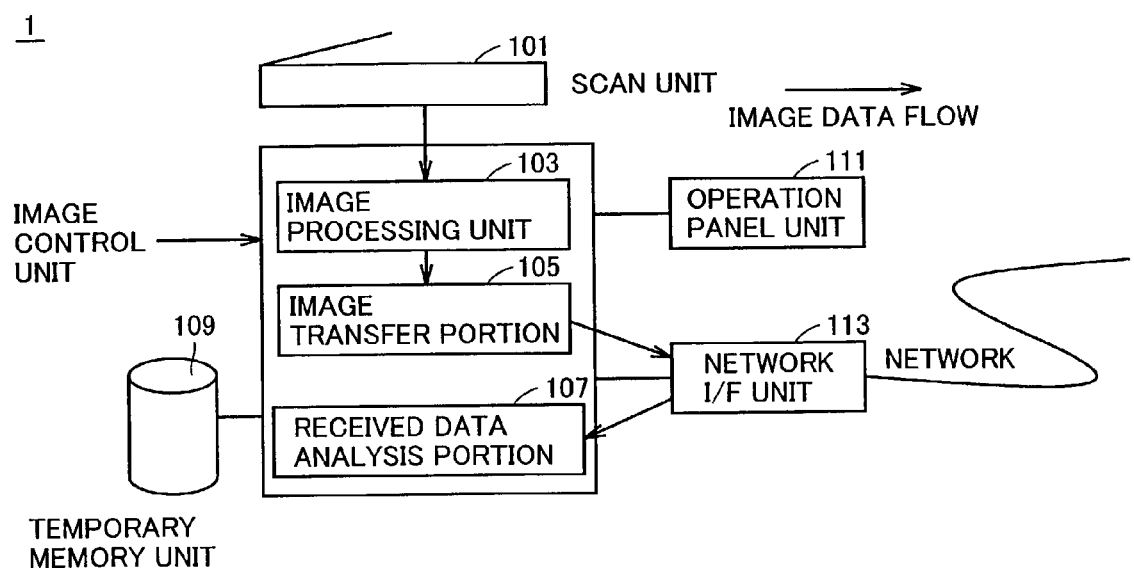
FIG. 3 is a block diagram showing a configuration of MFP in FIG. 1.

FIG. 3 is a block diagram showing the configuration of MFP 1.

Referring to FIG. 3, MFP 1 includes a scan unit (document reading unit) 101 reading and converting a document into electronic data, an image processing unit 103 performing image processing on the electronic data output by scan unit 101, an image transfer portion 105 for transferring image data externally, a temporary memory unit 109 temporarily storing data, an operation panel unit 111 receiving an input from the user, a network interface unit 113 for connecting to network N, and a received data analysis portion 107 analyzing data received through network interface unit 113.

Image processing unit 103, image transfer portion 105 and received data analysis portion 107 form an image control unit.

Scan unit 101 scans a document based on the reading conditions set through operation panel unit 111 and transfers the resulting image data to the image control unit. The image control unit first uses image processing unit 103 to convert the image received from scan unit 101 as appropriate based on the image processing setting on operation panel unit 111 and transfers it to image transfer portion 105. Image transfer portion 105 decides a destination based on the sending setting on operation panel unit 111 and transfers the image data to an external device (such as a personal computer) through network interface unit 113.

Figure 4:
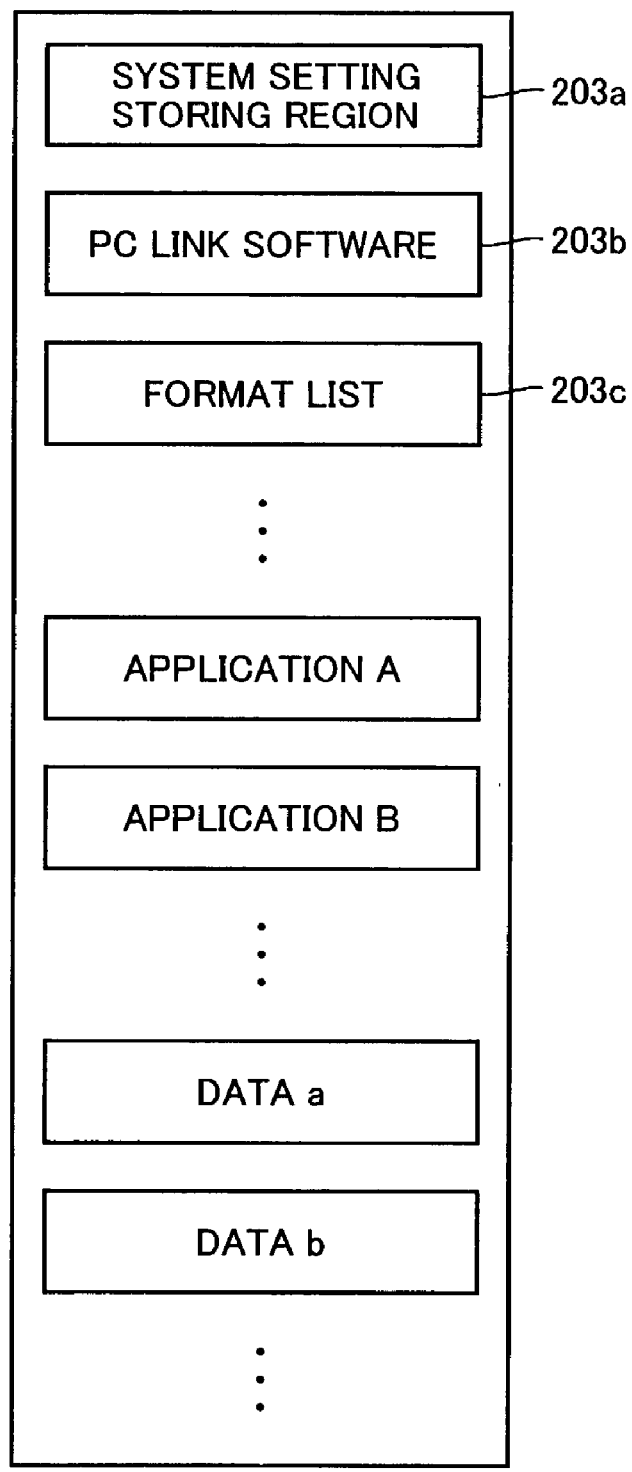
FIG. 4 is a diagram illustrating data stored in storage unit 203 of the personal computer.

FIG. 4 is a diagram showing the configuration of data stored in storage unit 203 of the personal computer.

Referring to FIG. 4, storage unit 203 has therein a system setting storing region 203a storing the setting of the personal computer. Furthermore, PC link software 203b is installed in storage unit 203.

Furthermore, storage unit 203 stores a format list 203c storing an application name in association with a file format that can be handled in that application. Storage unit 203 also stores different kinds of applications A, B, . . . and different kinds of data a, b, . . . .

FIG. 5 is a diagram showing an exemplary format list 203c in FIG. 4. As described above, the format list stores the application in association with the file format that can be handled in that application.

For example, Acrobat Reader which is one of applications can handle (display) a PDF format file, and Internet Explore can handle the data in JPEG format or TIFF format. The associative relation in this manner can be known from the format list.

When the user of the personal computer initiates PC link software 203b using operation unit 207, the PC link software searches through system setting storing region 203a and the installed applications stored in storage unit 203 of that personal computer, with reference to format list 203c.

The information specific to the personal computer (for example, a mail address, an IP address, a NetBIOS name and the like) and the kinds of applications stored in storage unit 203 of the personal computer are stored. PC link software 203b then sends to the associated MFP 1 a registration notice of the file format displayable in that personal computer, the information (PC information) specific to that personal computer, and the information of the displayable file format.

Figure 6:
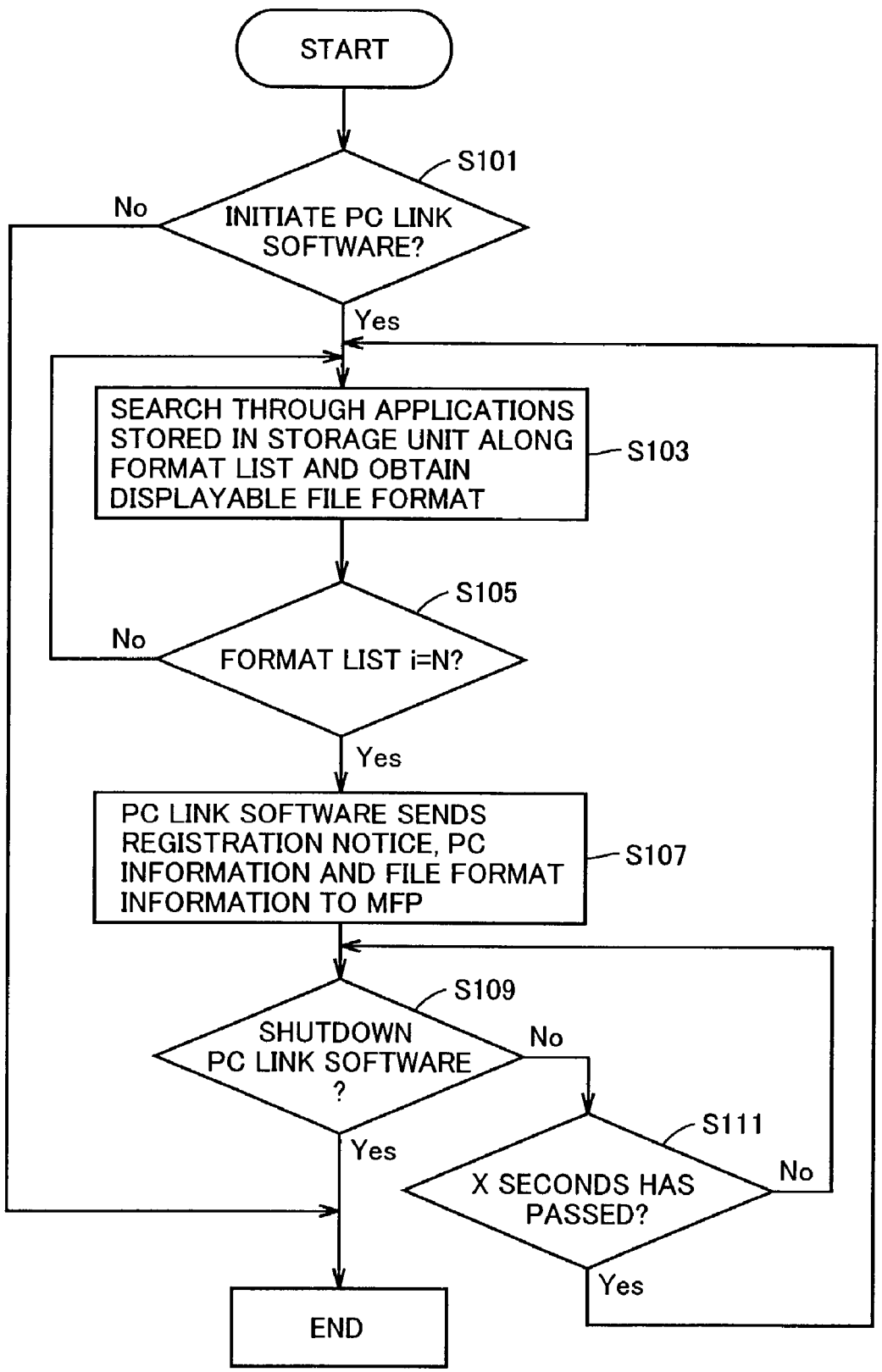
FIG. 6 is a flow chart showing the processing in PC link software.

FIG. 6 is a flow chart showing the operation of PC link software 203b in FIG. 4.

At step S101, it is determined whether the PC link software is initiated, and if it is initiated, at step S103, a search is conducted for the applications held in storage unit 203 in accordance with the format list, and the file format displayable in this personal computer is acquired.

Specifically, referring to FIG. 5, if Acrobat Reader and Internet Explore are installed as applications in the personal computer, the file formats displayable in the personal computer are PDF, JPEG and TIFF.

Returning to FIG. 6, at step S105, it is determined whether the search has been conducted up to the application in the final row of the format list, and if the search in the final row has ended, at step S107, the registration notice, the PC information (the terminal name, the IP address, the mail address, and the like) and the information of the displayable file formats are sent to the linked MFP.

At step S109, it is determined whether PC link software 203b shuts down (terminates). If YES, the processing here is ended. If NO, at step S111, it is determined whether the set time (X seconds) has passed. If NO, the processing from step S109 is repeated, and if YES, returning to step S103, the search for the applications is started again.

The search for the applications is started after the set time has passed, because it is examined whether there is any application newly registered.

Figure 7:
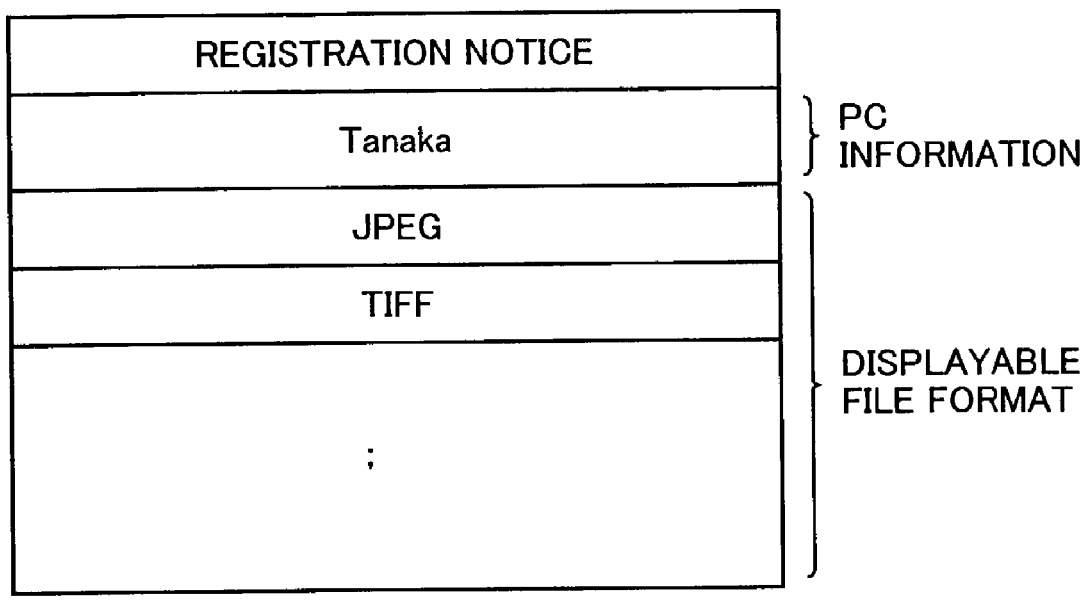
FIG. 7 is a diagram showing exemplary file format information.

FIG. 7 is a diagram showing exemplary information sent to MFP at step S107 in FIG. 6.

Referring to FIG. 7, information that prompts MFP to register data (registration notice), PC information (here indicating that the personal computer is named Tanaka), and a file format (here, JPEG and TIFF) displayable in that personal computer are sent in one file from the personal computer to MFP.

If the received PC information is registered in the address list in temporary memory unit 109, MFP which receives this file registers the information of the displayable file format in association therewith.

Figure 8:
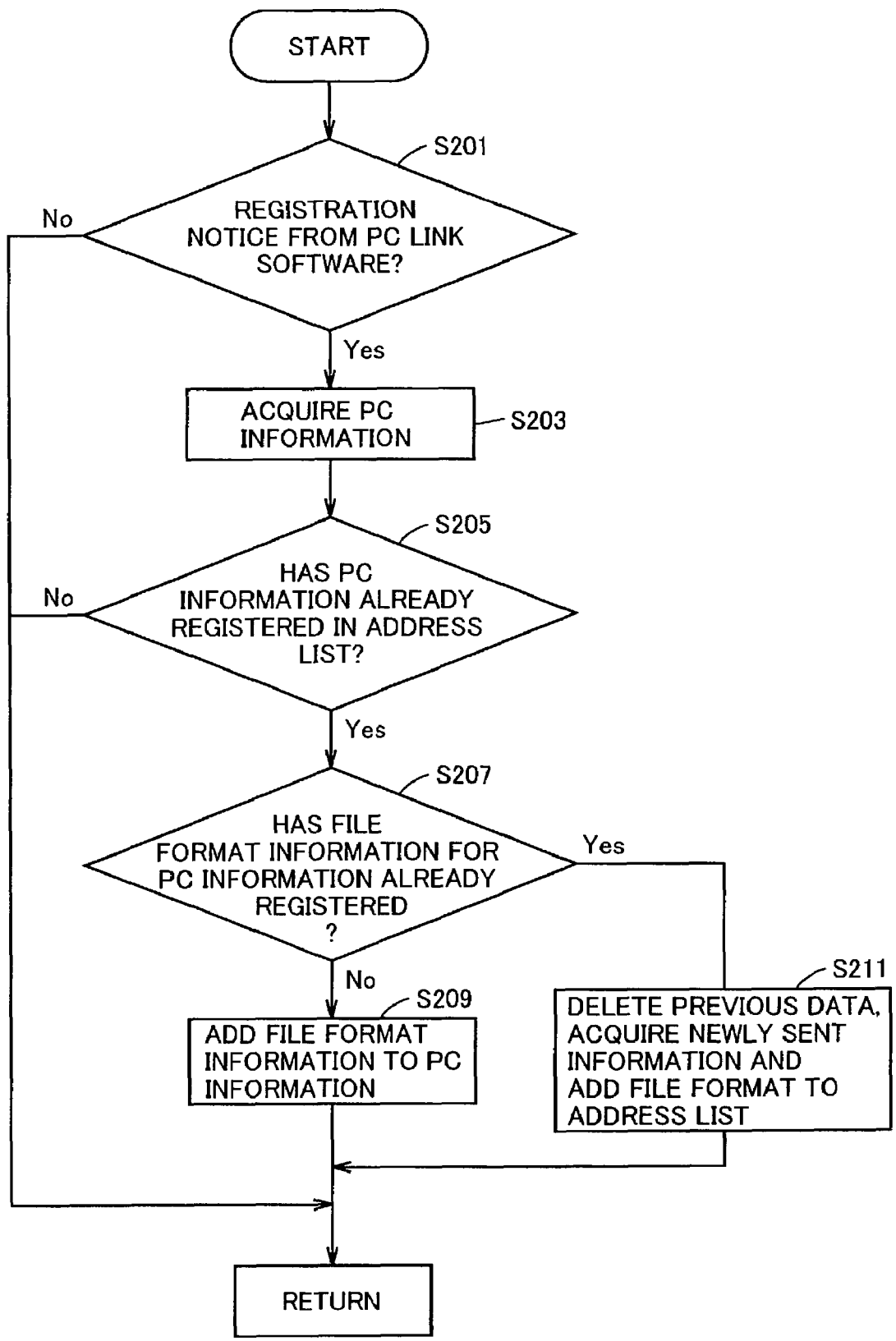
FIG. 8 is a flow chart showing the processing performed in MFP.

FIG. 8 is a flow chart showing the processing of registering the file format information in MFP.

Referring to FIG. 8, at step S201, it is determined whether the registration notice (see FIG. 7) is sent from PC link software 203b, and if the registration notice is sent, at step S203, the PC information sent with the registration notice is acquired.

At step S205, it is determined whether that PC information has already been registered in the address list, and if YES, at step S207, it is determined whether the file format displayable in that personal computer has already been registered.

If NO at step S207, at step S209, the received information of the displayable file format is registered in association with that PC information.

On the other hand, if YES at step S207, at step S211, the file format information of the personal computer that has already been registered in the address list is deleted. Then, with reference to the newly sent information, the information of the file format that can be displayed with that personal computer is registered in the address list in association with the PC information.

FIG. 9 is a diagram showing an exemplary address list.

Referring to FIG. 9, address Nos., user settings, PC information, and the information of file formats that can be displayed with the personal computer are associated with each other and stored in the address list.

The address list provides knowledge of in which personal computer and in which file format data can be displayed.

Figure 10:
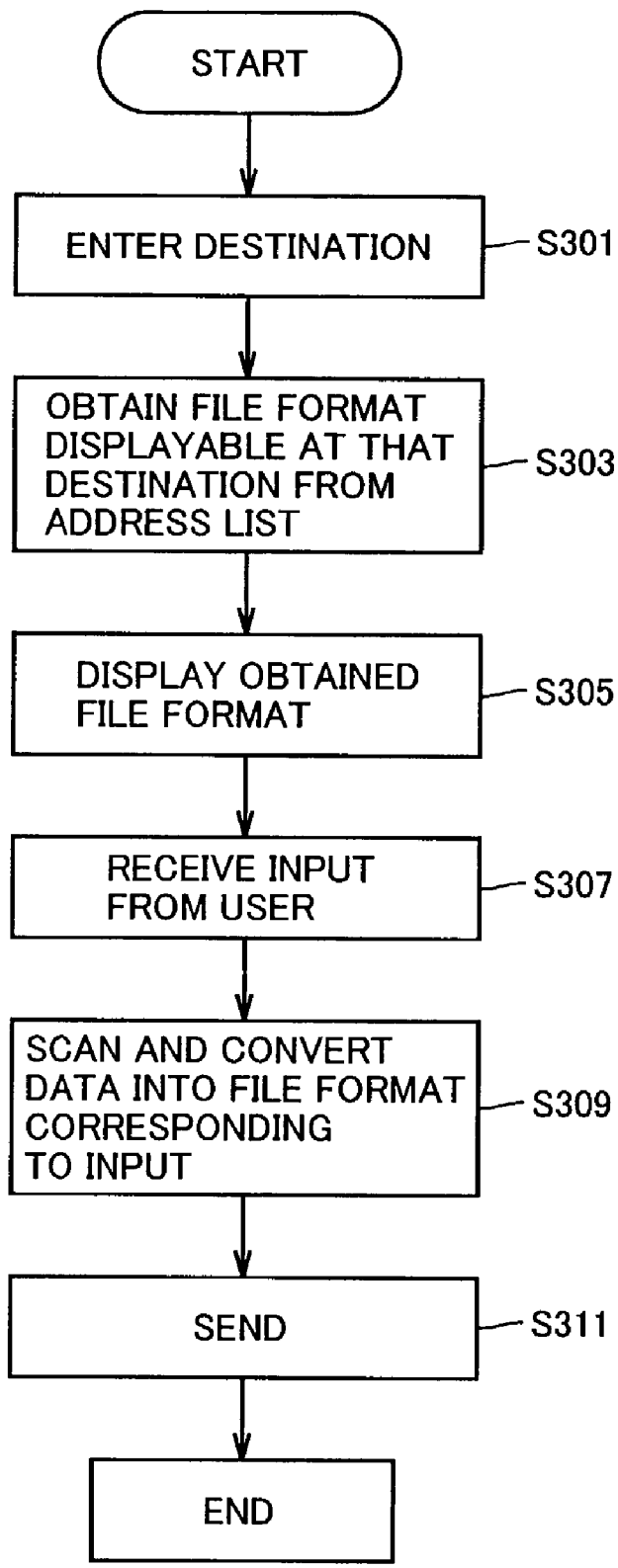
FIG. 10 is a flow chart showing the data-sending processing performed in MFP.

FIG. 10 is a flow chart showing the processing when the user allows MFP to read and send an image to an external personal computer.

Referring to FIG. 10, at step S301, the user enters a destination in MFP through operation panel unit 111. At step S303, MFP refers to the address list (FIG. 9) and acquires a file format displayable at the input destination.

At step S305, the file format displayable at the destination appears on the display of the operation panel unit 111. At step S307, the user selects a desired one out of the displayed file formats and enters the selection result into MFP through operation panel unit 111.

At step S309, scan unit 101 is used to scan a document and data is converted into the file format that corresponds to the user's selection. At step S311, the converted data is sent to the destination.

Figures 11, 12:
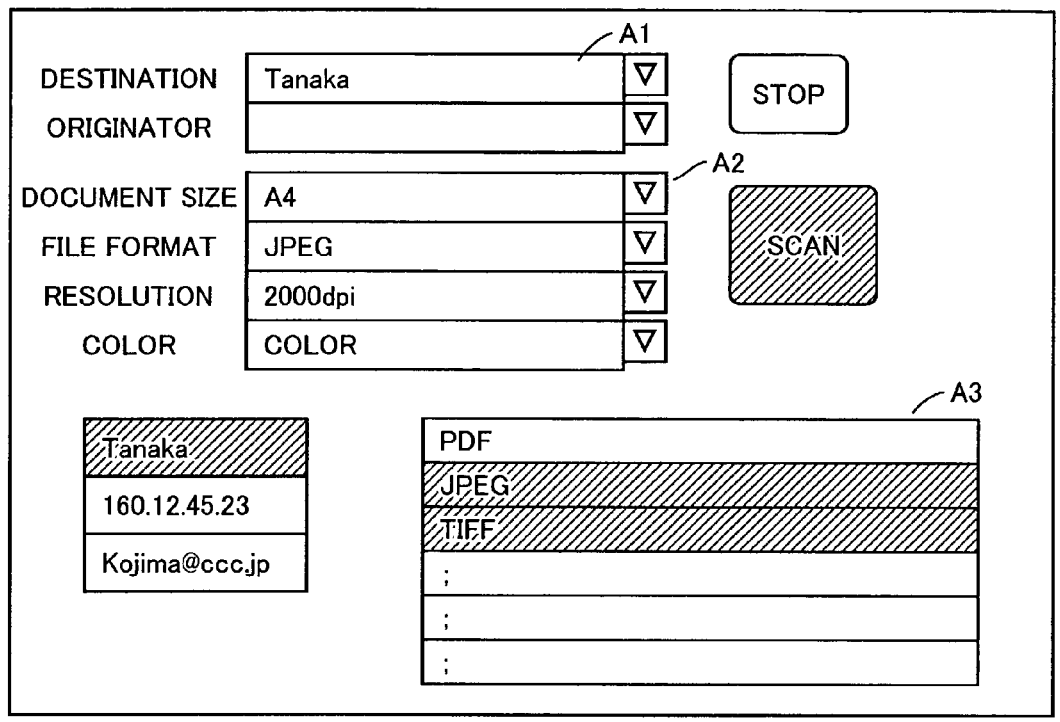
FIG. 11 is a view showing a display example of an operation panel unit.
FIG. 12 is a diagram showing an exemplary application table.

FIG. 11 shows a view showing a screen appearing on the display of operation panel unit 111 at step S305 in FIG. 10.

Referring to FIG. 11, the screen includes a field A1 for entering an originator and a destination, a field A2 for entering a document size, a file format, a resolution, and a color/monochrome choice, and a field A3 for the user to select a file format.

When the user enters a destination in the field shown with A1, the corresponding file formats are read out from the address list and displayed in the A3 field. The user selects the file format in which he/she wishes to send, from the A3 field.

In accordance with the present embodiment, when the user provides the setting for sending through operation panel unit 111, the file formats displayable (viewable) at the destination are displayed to allow for an arbitrary selection if the data destination has initiated the PC link software before. Since this selection is made out of the file formats displayable in the destination personal computer, such an inconvenience can be prevented in that the data cannot be displayed after being sent.

Second Embodiment

The hardware configuration of the data sending system in a second embodiment is the same as that in the first embodiment and therefore the description thereof will not be repeated.

The second embodiment is characterized in that an optimum one is selected out of a plurality of TIFF data formats when MFP sends data in a TIFF data format.

More specifically, image processing unit 103 of MFP stores an application table shown in FIG. 12 storing applications and TIFF tags and formats supported by those applications.

Referring to FIG. 12, the application table stores an application name, an image format corresponding to that application (corresponding form), and a TIFF tag and format supported by the application.

Furthermore, in the present embodiment, PC link software 203b of the personal computer sends the list of the file formats displayable at that personal computer as shown in FIG. 7 to MFP and also sends the information of the applications held by that personal computer and a format list (see FIG. 5) which is a list of file formats displayable in that application.

In the format list in the present embodiment, unlike the format list in the first embodiment, only the applications held by the personal computer and the corresponding file formats are described.

When the data destination is entered, MFP reads the list of file formats corresponding to that destination (FIG. 7) or the address list (FIG. 9) and displays the selectable file formats on the operation panel unit. Then the user is prompted to select the format of the file to be sent. At this point, if a TIFF format is selected as a file format, the applications that allow data to be displayed in the TIFF file format are selected out of the applications described in the format list (FIG. 5) corresponding to that personal computer, and are displayed on the operation panel.

The user then selects the application for use in displaying the data among them.

When the application is selected, MFP now refers to the application table shown in FIG. 12, reads the optimum TIFF tag and format for the selected application, and creates and sends TIFF data based on that information.

It is noted that if an application that is not described in the application table is selected, data in a Baseline TIFF (the minimum specification that an image viewer of TIFF should support) format is created and sent. As a result, at least the TIFF image data can be displayed at the receiving side.

Figure 13:
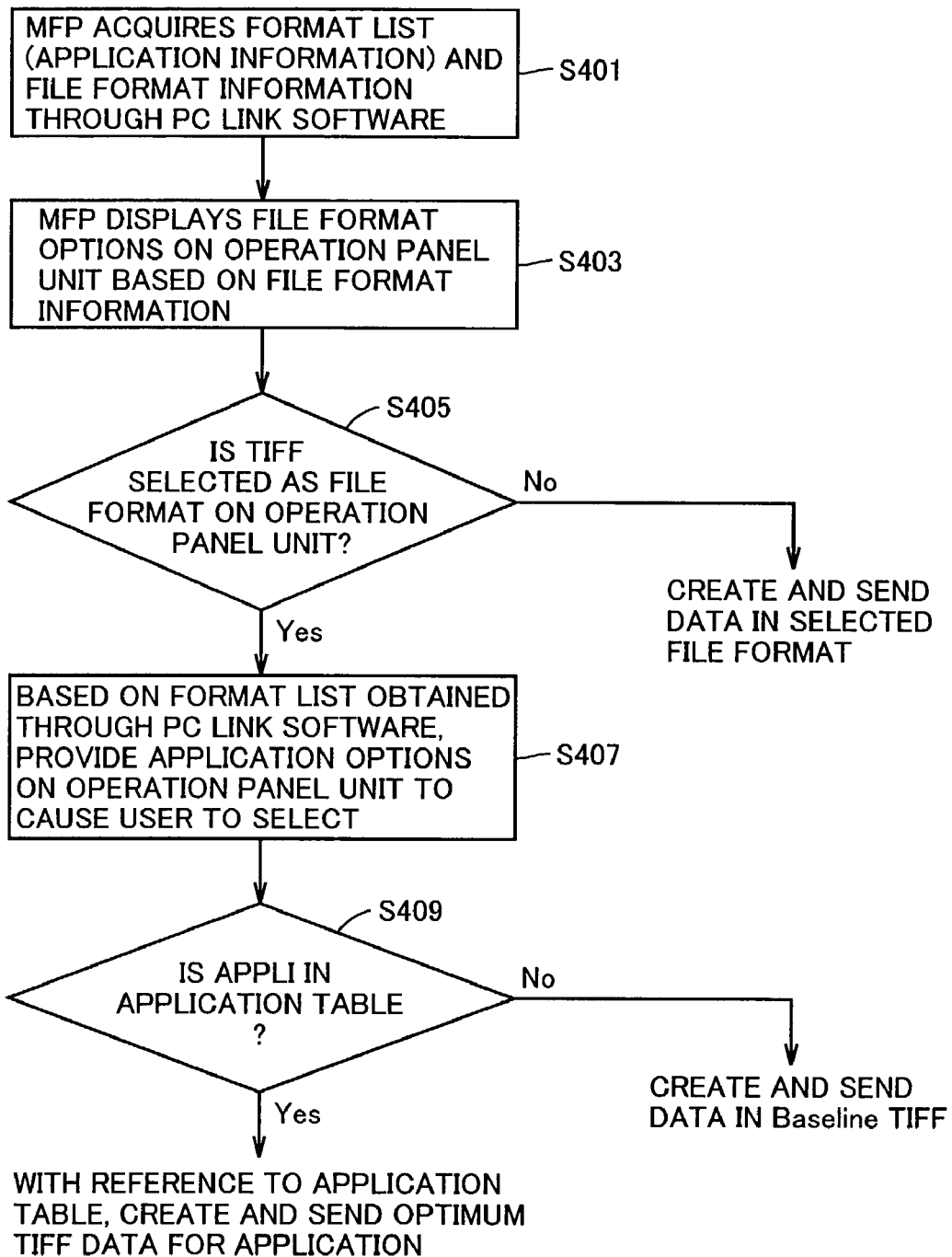
FIG. 13 is a flow chart showing the processing carried out by MFP in a system in a second embodiment.

FIG. 13 is a flow chart showing the operation of MFP in the present embodiment.

Referring to FIG. 13, at step S401, MFP acquires a format list and file format information for each personal computer through the PC link software. This format list provides knowledge of the kinds of applications held by each personal computer.

At step S403, if a destination of image data is entered, MFP displays selectable file formats on the operation panel unit based on the file format information corresponding to the personal computer at that destination.

At step S405, it is determined whether TIFF is selected as a file format through the operation panel unit, and if NO, data is created and sent in a selected file format.

If TIFF is selected, at step S407, based on the format list obtained through the PC link software, the kinds of applications included in the destination personal computer are displayed on the operation panel unit for prompting the user to select.

At step S409, it is determined whether the selected application is described in the application table in FIG. 12, and if YES, with reference to the application table, the optimum TIFF data for the application is created and sent.

On the other hand, if the selected application is not described in the application table at step S409, data is created and sent in versatile Baseline TIFF.

In accordance with the present embodiment, an image can be sent in optimum TIFF data for the application, and the sending of TIFF data that cannot be displayed at the receiving side can be prevented.

Third Embodiment

The hardware configuration of the data sending device in a third embodiment is the same as that in the first embodiment and therefore the description thereof will not be repeated herein.

In the third embodiment, similar to the first embodiment, when image data is sent from MFP, the file formats corresponding to the destination are read from the address list and displayed for prompting the user to select (alternatively, a plurality of file formats are displayed, irrespective of the file formats displayable at the destination, for prompting the user to select).

At this point, if TIFF is selected as a file format for sending, the kinds of applications are displayed in MFP, irrespective of the application in the destination personal computer, to allow the user to select a TIFF format in which application the sending is performed. In other words, unlike the second embodiment, in the present embodiment, MFP does not obtain the information of the installed application from each personal computer.

Since the user does not necessarily want data corresponding to the application installed in the destination personal computer, in the present embodiment, a plurality of application names are displayed in MFP to allow the user to select, irrespective of the application installed in the destination personal computer.

Figure 14:
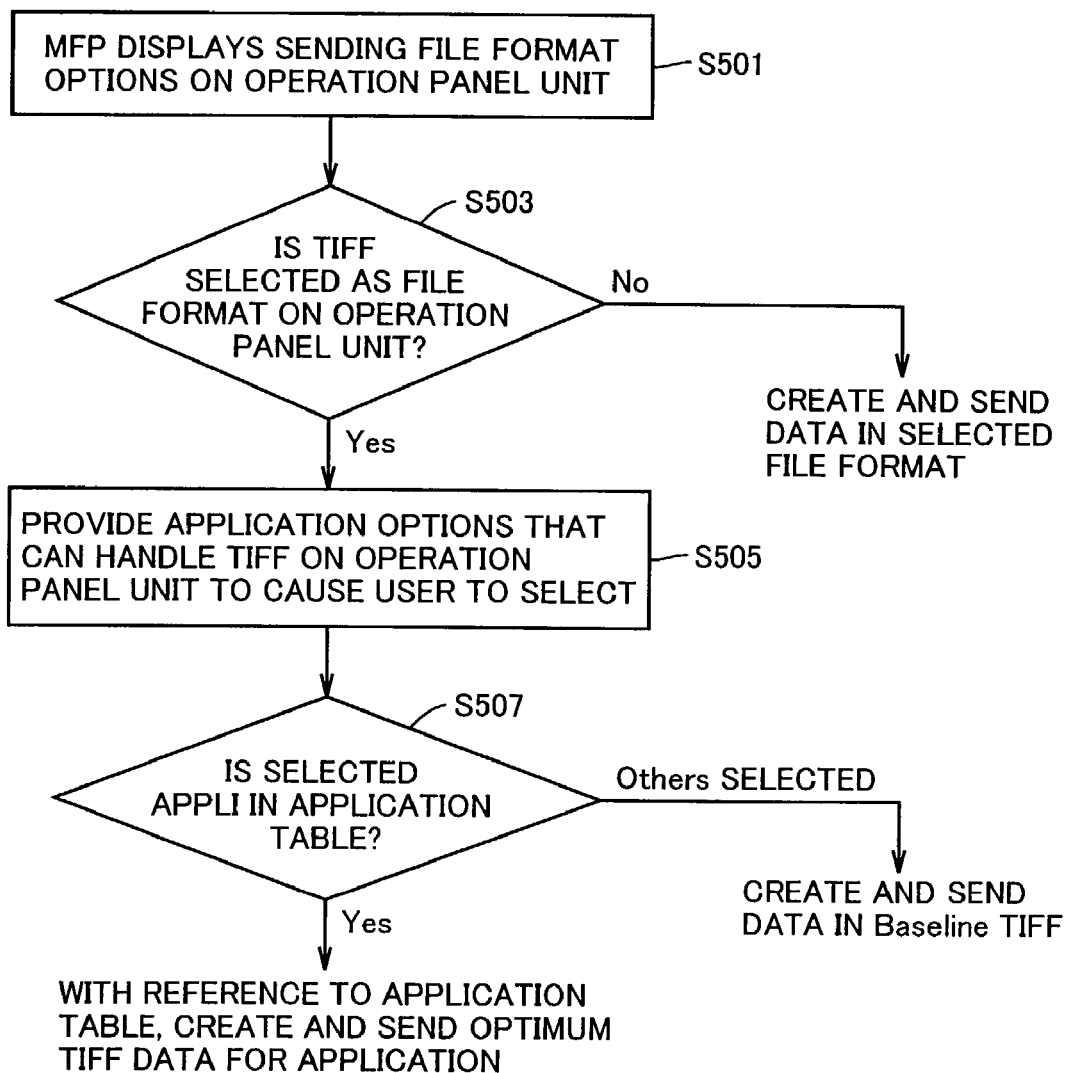
FIG. 14 is a flow chart showing the processing carried out by MFP in a system in a third embodiment.

FIG. 14 is a flow chart showing the processing performed by MFP in the present embodiment.

Referring to FIG. 14, at step S501, MFP displays file format options on the operation panel unit.

At step S503, it is determined whether the user selects TIFF as a file format through the operation panel unit, and if NO, data is created and sent in a selected file format.

If TIFF format is selected, at step S505, application options that can handle TIFF are displayed on the operation panel unit to allow the user to select.

At step S507, it is determined whether the selected application is described in the application table (FIG. 12), and if YES, with reference to the application table, the optimum TIFF data for the application is created and sent.

If the selected application is not described in the application table, data is created and sent in Baseline TIFF.

Effect etc. in Embodiments

As described above, in the first and second embodiments, since the file format displayable at a data destination can be known beforehand in MFP, such an inconvenience can be prevented in that data cannot be displayed (for example, an attachment file cannot open).

Specifically, in the first embodiment, data for specifying an external terminal and an image data format that the external terminal can handle are sent to MFP. In the second embodiment, data for specifying an external terminal, information of applications held by the external terminal, and an image data format that can be handled in the application are sent to MFP. Therefore, in the first embodiment, the image can be sent in the data format suitable for the external terminal. Furthermore, in the second embodiment, since the application included in the external terminal can be known at MFP, the optimum one can be selected in sending TIFF data.

In the third embodiment, an external terminal may or may not send an image data format that can be handled in that external terminal. In the third embodiment, TIFF data suitable for the application can be sent.

It is noted that in the embodiments above, it is desirable that PC link software 203b is associated with another software (for example, a printer driver or the other software frequently initiated) and the file format information and the like is sent to MFP when such software is initiated. Furthermore, MFP may inquire of an external terminal about information on the application included in the external terminal.

In other words, it is desirable that the PC link software examines an application held by a personal computer and sends a displayable file format and the like to MFP without the user being aware, by the user accessing a particular application not for the purpose of initiating the PC link software but for the other purpose.

It is noted that although in the second and third embodiments TIFF format that is optimum for the application is selected, a standard such as a high compression rate and a clear image can be used in this selection. This standard may be set by the user.

It is noted that the data communication method performed in the system described above can be provided as a program.

The program can be recorded in a recording medium such as a flexible disk, a CD-ROM, an ROM, an RAM and a memory card, and provided as a program product. Alternatively, the program can be provided by being recorded in a recording medium such as a hard disk contained in a computer. The program can be provided by being downloaded through a network.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A document reading device capable of sending image data obtained by reading a document to an external terminal through a network, comprising:
   a receiving portion receiving application information held by said external terminal through said network;
   a determining portion determining one or a plurality of data formats that can be processed in said external terminal, based on the received application information;
   a registering portion registering data for specifying said external terminal and a data format determined by said determining portion in an associated manner;
   a selecting portion presenting data formats registered in an associated manner in said registering portion to allow the user to select therefrom a data format in sending image data, when image data is sent to said external terminal; and
   a control portion performing control such that said read document is read into image data in a data format selected in said selecting portion and is sent to said external terminal.

2. The document reading device according to claim 1, further comprising:
   an inquiry portion inquiring of said external terminal about information regarding an application included in said external terminal.

3. The document reading device according to claim 1, wherein
   when a TIFF data format is selected in said selecting portion, an optimum one is selected out of a plurality of TIFF data formats determined by said determining portion as being able to be processed in said external terminal.

4. The document reading device according to claim 1, wherein
   when a TIFF data format is selected in said selecting portion, the user is prompted to select an application that can handle a TIFF format and data is sent in a TIFF format suitable for a selected application.

5. The document reading device according to claim 4, wherein
   when an application other than applications registered in an application table is selected, a versatile TIFF format is selected out of TIFF formats.

6. The document reading device according to claim 1, wherein
   said data for specifying an external terminal is one of a terminal name, an IP address, and a mail address applied to an external terminal.

7. A document reading device capable of sending image data obtained by reading a document to an external terminal through a network, comprising:
   a storage unit storing information of different kinds of applications that can handle image data and image data formats in an associated manner;
   a display unit displaying the stored application information and image data formats in a list;
   a selecting portion allowing the user to select one of the displayed application information or image data formats; and
   a control portion performing control such that said read document is read into image data in an image data format corresponding to selected application information or a selected image data format through said selecting portion, and is sent to the external terminal.

8. An image data processing method allowing image data obtained by reading a document to be sent to an external terminal through a network, comprising:
   a receiving step of receiving application information held by said external terminal through said network;
   a determining step of determining one or a plurality of data formats that can be processed in said external terminal, based on the received application information;
   a registering step of registering data for specifying said external terminal and a data format determined at said determining step in an associated manner;
   a selecting step of presenting data formats registered in an associated manner at said registering step to allow the user to select therefrom a data format in sending image data, when image data is sent to said external terminal; and
   a control step of performing control such that said read document is read into image data in a data format selected at said selecting step and is sent to said external terminal.

9. A computer readable medium containing an image data processing program product allowing image data obtained by reading a document to be sent to an external terminal through a network, said image data processing program product causing a computer to carry out:
   a receiving step of receiving application information held by said external terminal through said network;

a determining step of determining one or a plurality of data formats that can be processed in said external terminal, based on the received application information;

a registering step of registering data for specifying said external terminal and a data format determined at said determining step in an associated manner;

a selecting step of presenting data formats registered in an associated manner at said registering step to allow the user to select therefrom a data format in sending image data, when image data is sent to said external terminal; and a control step of performing control such that said read document is read into image data in a data format selected at said selecting step and is sent to said external terminal.

10. A document reading device capable of sending image data obtained by reading a document to an external terminal through a network, comprising:

a receiving portion receiving data for specifying said external terminal and information regarding an image data format that can be processed in said external terminal, through said network;

a registering portion registering said data for specifying said external terminal and said image data format in an associated manner;

a selecting portion presenting image data formats registered in an associated manner in said registering portion to allow the user to select therefrom an image data format in sending image data, when image data is sent to said external terminal; and a control portion performing control such that said read document is read into image data in a data format selected in said selecting portion and is sent to said external terminal.

* * * * *